United States Patent
Watanabe et al.

(10) Patent No.: US 11,840,286 B2
(45) Date of Patent: Dec. 12, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/347,052

(22) Filed: Jun. 14, 2021

(65) Prior Publication Data
US 2022/0033009 A1 Feb. 3, 2022

(30) Foreign Application Priority Data
Jul. 30, 2020 (JP) .............................. 2020-1728749

(51) Int. Cl.
*B62D 35/02* (2006.01)
*H05H 1/24* (2006.01)

(52) U.S. Cl.
CPC ........... *B62D 35/02* (2013.01); *H05H 1/2439* (2021.05)

(58) Field of Classification Search
CPC ....... B62D 35/00; B62D 35/005; B62D 35/02
USPC ................................ 296/180.1, 180.2, 180.5
See application file for complete search history.

(56) References Cited

U.S. PATENT DOCUMENTS

| | | | | |
|---|---|---|---|---|
| 4,180,290 A | * | 12/1979 | Drews | B62D 35/00 244/130 |
| 4,511,170 A | * | 4/1985 | Sankrithi | B62D 35/008 296/180.1 |
| 10,011,344 B1 | * | 7/2018 | Santavicca, Jr. | B64C 1/38 |
| 2010/0072777 A1 | * | 3/2010 | Ramsay | B62D 35/00 296/180.1 |
| 2012/0061993 A1 | | 3/2012 | Hasegawa et al. | |
| 2013/0026797 A1 | * | 1/2013 | Onodera | B62D 35/02 296/204 |
| 2016/0068203 A1 | * | 3/2016 | Uchiyama | B62D 35/02 296/180.1 |
| 2017/0057565 A1 | * | 3/2017 | Sarhadiangardabad | B62D 35/02 |
| 2017/0297634 A1 | * | 10/2017 | Han | B62D 35/00 |
| 2019/0152543 A1 | * | 5/2019 | Shiga | B62D 37/02 |
| 2019/0342985 A1 | * | 11/2019 | Dadheech | H05H 1/2406 |
| 2021/0355923 A1 | * | 11/2021 | Niwa | B62D 35/00 |

FOREIGN PATENT DOCUMENTS

| | | |
|---|---|---|
| JP | 2012-056499 A | 3/2012 |
| JP | 2019-111965 A | 7/2019 |

* cited by examiner

*Primary Examiner* — Jason S Daniels
(74) *Attorney, Agent, or Firm* — McGinn I.P. Law Group, PLLC

(57) ABSTRACT

An airflow adjusting apparatus to be provided in a vehicle includes a flap and an airflow generator. The vehicle includes a wheel disposed to be partly protruded downward from a vehicle body of the vehicle. The flap is protruded, in front of the wheel, downward from the vehicle body. The airflow generator is configured to generate an airflow, and provided in an underneath of the vehicle body. The airflow generator is configured to generate an airflow. The airflow moves backward and downward of the vehicle and the airflow moves obliquely relative to a horizontal plane.

20 Claims, 6 Drawing Sheets

AIRFLOW ADJUSTING APPARATUS

CROSS-REFERENCE TO RELATED APPLICATIONS

This application claims priority from Japanese Patent Application No. 2020-128749 filed on Jul. 30, 2020, the entire contents of which are hereby incorporated by reference.

BACKGROUND

The disclosure relates to an airflow adjusting apparatus that adjusts airflows between an underneath of a vehicle body of a vehicle and a road surface.

For vehicles such as a four-wheeled automobile, airflows colliding with a wheel under a vehicle body disturb a flow field, causing aggravation of, for example, air resistance, aerodynamic noise, and aerodynamic vibration. This leads to a desire for suppression of disturbance of airflows around the wheel.

As an existing airflow adjusting technique around the wheel, for example, Japanese Unexamined Patent Application Publication (JP-A) No. 2012-56499 describes an airflow adjusting apparatus including a flap. The flap protrudes, in front of a wheel house, downward from a vehicle body. The flap suppresses a relative wind, or a so-called traveling wind, from colliding with the wheel, leading to reduction in an overall drag of a vehicle. A relative wind refers to an airflow that moves relative to the vehicle body in accompaniment with travel of the vehicle.

Moreover, in recent years, proposals have been made for airflow adjustment around the vehicle body with the use of a device that actively generates an airflow.

For example, JP-A No. 2019-111965 describes a windshield wiper that wipes a windshield of a vehicle. The windshield wiper includes a wiper arm provided with a plasma actuator that jets out an airflow.

SUMMARY

An aspect of the technology provides an airflow adjusting apparatus to be provided in a vehicle. The vehicle includes a wheel disposed to be partly protruded downward from a vehicle body of the vehicle. The airflow adjusting apparatus includes a flap and an airflow generator. The flap is protruded, in front of the wheel, downward from the vehicle body. The airflow generator is configured to generate an airflow, and provided in an underneath of the vehicle body and vehicle-widthwise inwardly from the wheel. The airflow moves backward and downward of the vehicle, and the airflow moves obliquely relative to a horizontal plane.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
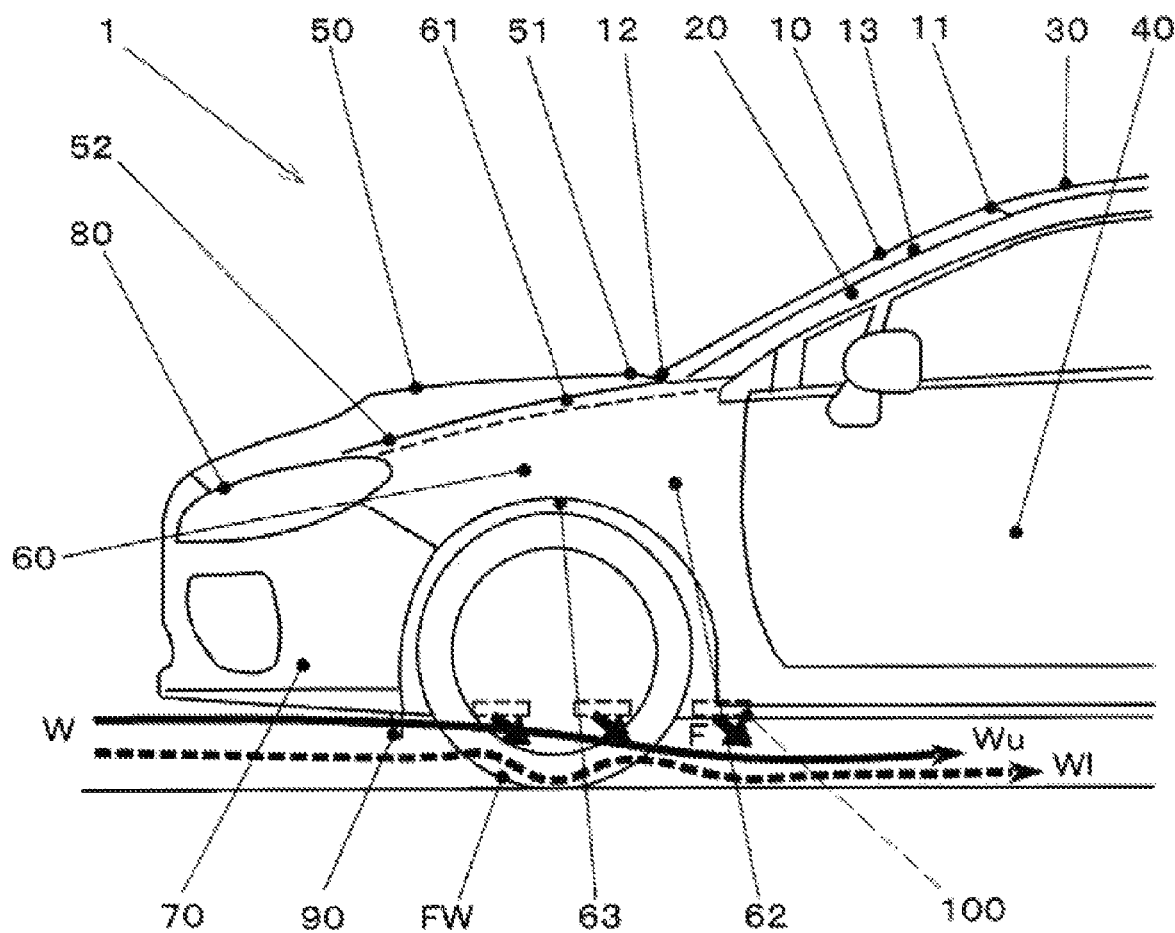
FIG. 1 is a schematic side view of a front portion of a vehicle body of a vehicle including an airflow adjusting apparatus according to a first embodiment of the disclosure.

In a case with a flap provided directly in front of a front wheel, an airflow collides with the flap, and separates itself to the right and left sides of the front wheel, avoiding the front wheel. Thus, the airflow moves backward of the vehicle, passing through the right and left sides of the front wheel, with relatively small turbulence and at a high flow rate.

In the meanwhile, under the flap, the airflow collides directly with the front wheel, to form a turbulent flow having relatively great turbulence, or vortex, and moves at a low flow rate, or moves slowly, under a floor of the vehicle.

The airflow having collided with the flap and the airflow having collided with the wheel under the flap join together as is, causing the airflow having collided with the flap to get caught in the airflow having collided with the wheel, to form a turbulent flow, with a decrease in the flow rate of the airflow having collided with the flap. This contributes to aggravation of, without limitation, air resistance and operation stability.

It is desirable to provide an airflow adjusting apparatus that makes it possible to appropriately adjust airflows between an underneath of a vehicle body and a road surface.

First Embodiment

Some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same reference characters to avoid redundant description, and elements not in direct relation to the technology may not be illustrated.

In the following, an airflow adjusting apparatus according to a first embodiment of the disclosure is described.

The airflow adjusting apparatus according to the first embodiment may be provided in, for example, an automobile, or a moving body. The automobile may be, for example, a passenger car of a so-called two-box or three-box vehicle shape that includes an engine room in front of a cabin.

FIG. 1 is a schematic side view of a front portion of a vehicle body of a vehicle including the airflow adjusting apparatus according to the first embodiment.

A vehicle 1 may include, without limitation, a windshield 10, a front pillar 20, a roof 30, a front door 40, a hood 50, a fender 60, a bumper face 70, a front combination lamp 80, and a flap 90.

The windshield 10 is a glass window provided in a front portion of the cabin.

The windshield 10 may have a substantially rectangular shape. The windshield 10 may be disposed in a backward tilted attitude, with an upper end 11 positioned on rear side of the vehicle relative to a lower end 12.

A side end 13 of the windshield 10 may be disposed along the front pillar 20.

The windshield 10 may include laminated glass of a quadric surface, and be curved or rounded to protrude toward front side of the vehicle.

The front pillar 20, or an A pillar, is a vehicle body structural member that extends along the side end 13 of the windshield 10.

A back end of the front pillar 20 may be disposed in adjacency to a sash provided around a front glass door in an upper portion of the front door 40.

The roof 30 is a panel that constitutes an upper surface of the cabin.

The roof 30 may extend, from the upper end 11 of the windshield 10, toward the rear side of the vehicle.

The front door 40 may be an openable and closeable door provided in a side surface of the front portion of the cabin.

The front door 40 may open or close by pivoting around an unillustrated hinge provided at a front end of the front door 40.

The hood 50 is an exterior member provided over an upper portion of the engine room. The hood 50 may be a lid-shaped body of an open and close type.

A rear edge 51 of the hood 50 may be disposed in front of the lower end 12 of the windshield 10, in spaced relation from the lower end 12 in a vehicle longitudinal direction.

The rear edge 51 may be of a curved shape protruded forward of the vehicle in plan view.

A side edge 52 of the hood 50 may be disposed in adjacency to a vehicle-widthwise inner edge of an upper surface 61 of the fender 60, with a gap in between. The gap is unavoidably provided.

The fender 60 is an exterior member of the vehicle that constitutes, for example, a side surface of the engine room.

The fender 60 may include, without limitation, the upper surface 61 and a side surface 62.

The upper surface 61 is a region adjacent to a side end of the side edge 52 of the hood 50. The upper surface 61 may be formed to trace broadly a curved plane extending vehicle-widthwise outward from a curved plane of an outer surface of the hood 50.

The side surface 62 may extend downward from the vicinity of a vehicle-widthwise outer end of the upper surface 61.

Moreover, the side surface 62 may have an arcuate notch 63 of a wheel house that houses a front wheel FW.

The bumper face 70 is a resin-made exterior member provided in a lower portion of a front end of the vehicle.

The bumper face 70 may be provided in front of the arcuate notch 63 in the fender 60.

The front combination lamp 80 may include various lighting devices housed and unitized in a common housing. Non-limiting examples of the lighting devices may include a headlamp, a position lamp, and a turn signal lamp.

The front combination lamp 80 may be disposed on lower side of the hood 50 and on upper side of the bumper face 70 at the front end of the vehicle.

The flap 90 is a plate member protruded, in front of the front wheel FW, downward from an underside of the vehicle body.

The flap 90 may laterally separate a relative wind W, or a traveling wind, flowing from forward of the vehicle toward under a floor of the vehicle, to make airflow adjustment, and to suppress the relative wind W from colliding with the front wheel FW. A relative wind W refers to an airflow that moves relative to the vehicle body in accompaniment with travel of the vehicle.

The airflow adjusting apparatus of the first embodiment may include a plasma actuator 100 described below.

Figure 2:
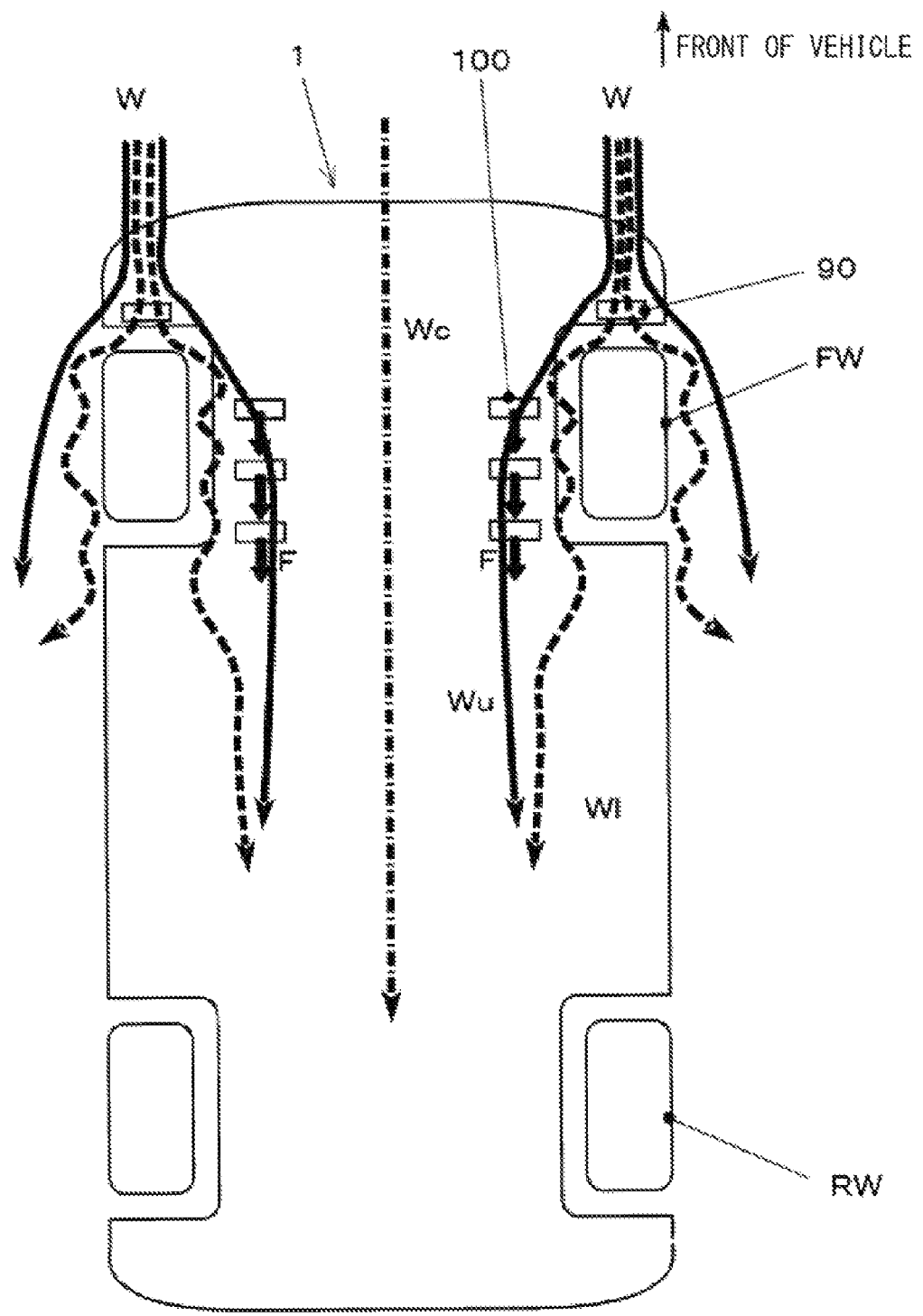
FIG. 2 schematically illustrates the vehicle according to the first embodiment, as viewed from underneath.

FIG. 2 schematically illustrates the vehicle of the first embodiment, as viewed from underneath.

As illustrated in FIG. 2, the plasma actuator 100 may include a plurality of plasma actuators 100 provided in an underneath of the vehicle body of the vehicle 1.

The plasma actuator 100 may generate an airflow F, with electric power supplied from a power supply device. In one embodiment of the disclosure, the plasma actuator 100 may serve as an "airflow generator".

For example, the plasma actuator 100 may be attached to whatever is exposed downward of the vehicle, out of a main body of the vehicle body (e.g., a front side frame and a floor panel) or a component to be attached to the main body of the vehicle body (e.g., an undercover and a sub-frame).

The plasma actuator 100 is provided, in an underneath of the vehicle 1, vehicle-widthwise inwardly from the left and right front wheels FW. The plurality of the plasma actuators 100 may be disposed in line along the vehicle longitudinal direction. For example, in the case of FIG. 2, the three plasma actuators 100 may be disposed in line along the vehicle longitudinal direction.

The plasma actuator 100 may be disposed in lateral symmetry.

Each of the plasma actuators 100 is configured to generate the airflow F backward and downward of the vehicle 1, in a side view of the vehicle 1. The airflow F moves obliquely relative to the vehicle longitudinal direction and to a vertical direction.

Moreover, some or all of the plurality of the plasma actuators 100 may be disposed on the rear side of the vehicle relative to an axle of the front wheel FW.

In the example illustrated in FIG. 2, the plasma actuator 100 in a first row from the front side of the vehicle may be positioned, in the vehicle longitudinal direction, immediately before the axle of the front wheel FW. The plasma actuators 100 in a second row and a third row may be disposed on the rear side of the vehicle relative to the axle.

Figure 3:
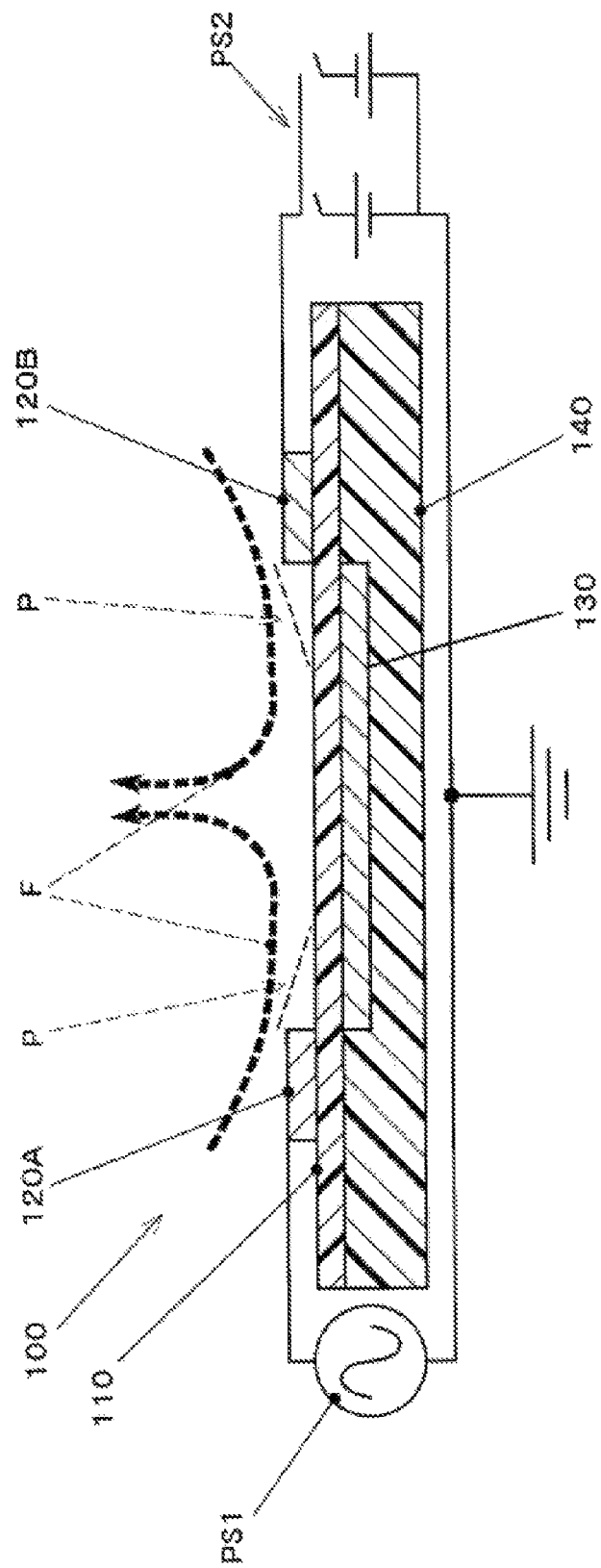
FIG. 3 is a schematic cross-sectional view of a three-pole plasma actuator to be provided in the airflow adjusting apparatus according to the first embodiment.

FIG. 3 is a schematic cross-sectional view of a three-pole plasma actuator to be provided in the airflow adjusting apparatus of the first embodiment.

The three-pole plasma actuator 100 may include, without limitation, a dielectric 110, upper electrodes 120A and 120B, a lower electrode 130, and an insulator 140. The upper electrodes 120A and 120B may be also collectively referred to as upper electrodes 120.

The dielectric 110 may be a sheet-shaped member including, for example, a fluorocarbon resin such as polytetrafluoroethylene.

The upper electrodes 120 and the lower electrode 130 may each include an electrically-conductive tape including a thin metal film of, for example, copper.

The upper electrodes 120 may be attached to outer surface side of the dielectric 110. The outer surface side of the dielectric 110 refers to side exposed to the outside when the plasma actuator 100 is attached to, for example, the vehicle body.

The lower electrode 130 may be attached to inner surface side of the dielectric 110 that is opposite to the outer surface side of the dielectric 110.

The upper electrodes 120 and the lower electrode 130 may be offset in an in-plane direction of the dielectric 110.

In the three-pole plasma actuator 100 as illustrated in FIG. 3, a pair of the upper electrodes 120, i.e., the upper electrodes 120A and 120B, may be disposed in symmetry on both sides of the lower electrode 130. For the upper electrodes 120A and 120B, independent power supplies PS1 and PS2 may be provided respectively.

The insulator 140 may be a sheet-shaped member that serves as a base of the plasma actuator 100. The insulator 140 may be provided, on the inner surface side of the dielectric 110, to cover the lower electrode 130.

Between the upper electrode 120A and the lower electrode 130 of the plasma actuator 100, an alternating voltage having a predetermined waveform may be applied by the power supply PS1.

Between the upper electrode 120B and the lower electrode 130, a polarity switchable DC (direct-current) voltage may be applied by the power supply PS2.

Applying such voltages causes generation of a plasma discharge P between each pair of the electrodes.

It is necessary for the applied voltages by the power supplies PS1 and PS2 to be high enough to cause electrical breakdown and generate the plasma discharge P. For example, the applied voltage may range from about 1 kV to about 10 kV.

In a case where the applied voltage is an alternating voltage or a pulsed DC voltage, a frequency of the applied voltage may range, for example, from about 1 kHz to about 10 kHz.

At this occasion, the air on outer surface side of the plasma actuator 100 is drawn to the plasma discharge P, causing generation of the airflow F in a wall jet flowing along the dielectric 110.

Moreover, the plasma actuator 100 is configured to reverse a direction of the airflow F, by controlling the waveform and polarity of the alternating voltage to be applied.

The three-pole plasma actuator 100 as mentioned above is configured to generate the airflows F opposite to each other, with the use of, for example, the plasma discharge P produced between the upper electrode 120A and the lower electrode 130 and the plasma discharge P produced between the upper electrode 120B and the lower electrode 130.

In this case, the opposite airflows F collide and join together while being deflected, to form a composite airflow moving along a direction that draws away from a main plane of the plasma actuator 100, e.g., typically, along a normal direction.

Moreover, in the three-pole plasma actuator 100, energizing solely the upper electrode 120A or the upper electrode 120B makes it possible to generate an airflow moving along a surface of the relevant upper electrode 120A or 120B.

Furthermore, controlling, for example, a voltage to be applied to the upper electrodes 120A and 120B makes it possible to control a direction of movement of the airflow after joining together.

In the first embodiment, using such characteristics of the three-pole plasma actuator 100 as described above leads to generation of the composite airflow F that moves obliquely relative to the floor panel FP and a normal direction to the floor panel FP.

The airflow adjusting apparatus of the first embodiment may include a control system described below, to supply driving electric power to the plasma actuator 100 described above, allowing the plasma actuator 100 to generate the airflow F for airflow adjustment of relative winds and air flows moving between the underneath of the vehicle body and the road surface.

Figure 4:
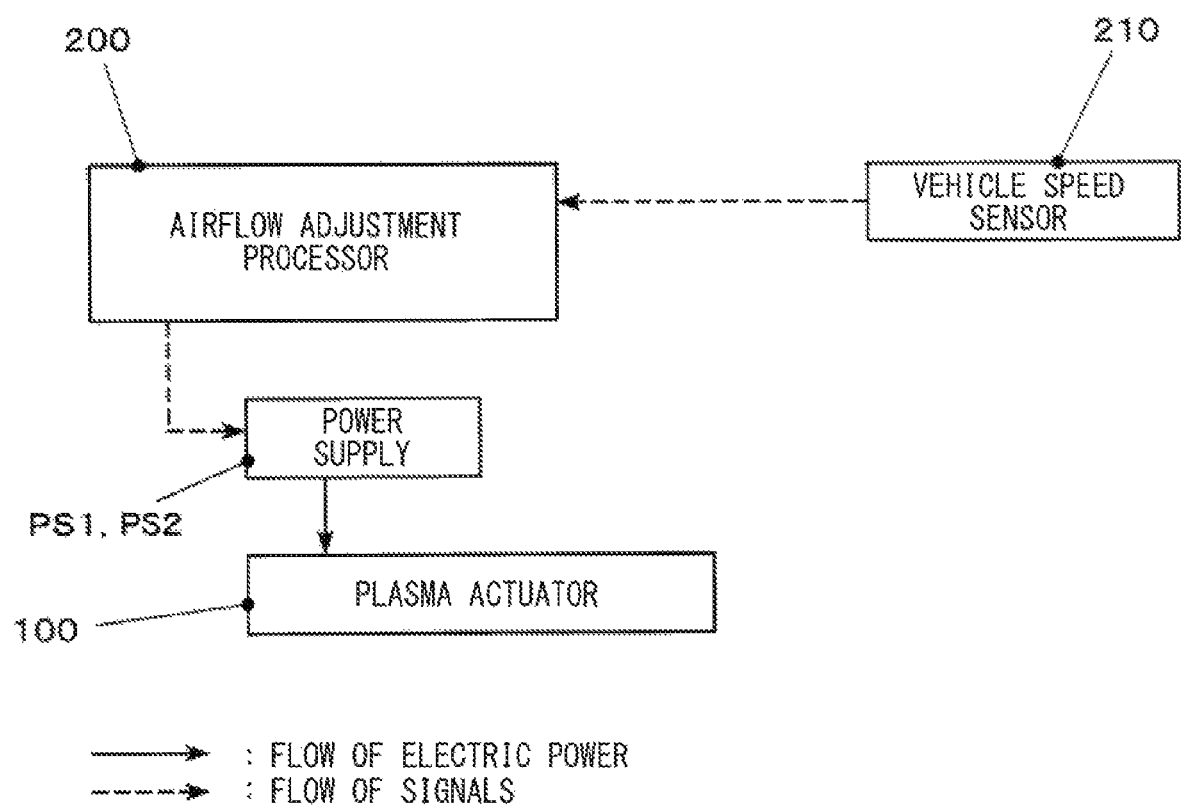
FIG. 4 is a block diagram illustrating a configuration of a control system of the plasma actuator in the airflow adjusting apparatus according to the first embodiment.

FIG. 4 is a block diagram illustrating a configuration of the control system of the plasma actuator in the airflow adjusting apparatus of the first embodiment.

The control system may include, without limitation, an airflow adjustment processor 200 and a vehicle speed sensor 210.

The airflow adjustment processor 200 may control the power supplies PS1 and PS2 to control whether to operate or stop the plasma actuator 100. In operating the plasma actuator 100, the airflow adjustment processor 200 may control strength of the airflow F, e.g., an amount of flow and a flow rate.

The airflow adjustment processor 200 may include, for example, a microcomputer including, without limitation, an information processor such as a CPU (Central Processing Unit), a storage such as a RAM (Random Access Memory) and/or a ROM (Read Only Memory), input and output interfaces, and a bus that couples them together.

The vehicle speed sensor 210 may detect a traveling speed of the vehicle 1, or a vehicle speed.

The vehicle speed sensor 210 may be provided in a hub bearing housing that rotatably holds the front wheel FW or a rear wheel RW. The vehicle speed sensor 210 is configured to output a vehicle speed signal corresponding to a rotational speed of the wheel.

The airflow adjustment processor 200 may operate the plasma actuator 100 to generate the airflow F in a case where the vehicle speed detected by the vehicle speed sensor 210 is equal to or higher than a predetermined threshold. The airflow F moves, or moves obliquely, backward and downward of the vehicle.

The strength of the airflow F may be set to increase in accordance with an increase in the vehicle speed detected by the vehicle speed sensor 210.

Moreover, for example, a direction of movement, or a direction of ejection, of the airflow F may be changed to deflect the airflow F downward earlier, and to cause the airflow F to be more inclined to a horizontal plane, or to cause the airflow F to fall at a steeper angle, in accordance with the increase in the vehicle speed, i.e., an increase in a flow rate of the relative wind W.

In the following, workings and effects of the first embodiment are described.

As denoted by bold arrows in FIGS. 1 and 2, on forward travel of the vehicle 1, a relative wind, i.e., a so-called traveling wind, occurs. The relative wind moves from the front side of the vehicle to the rear side of the vehicle relative to the vehicle body.

The relative wind W moves into the vicinity of the front wheel FW under the floor of the vehicle body, i.e., between the underneath of the vehicle body and the road surface. A relatively upper component within the relative wind W collides with the flap 90, and separates itself laterally, i.e., in the vehicle widthwise direction, into air flows Wu. The air flows Wu move backward of the vehicle, passing through the right and left sides of the front wheel FW.

In the meanwhile, a component within the relative wind W at a lower level than the air flows Wu, i.e., closer to the road surface, collides directly with a lower portion of the front wheel FW, and separates itself laterally into air flows W1. The air flows W1 move backward of the vehicle, passing through the right and left sides of the front wheel FW.

The lower-level air flows W1 collide with a tire and a wheel of the rotating front wheel FW, causing relatively greater turbulence, or vortex, and a lower flow rate than the upper-level air flows Wu.

Figure 5:
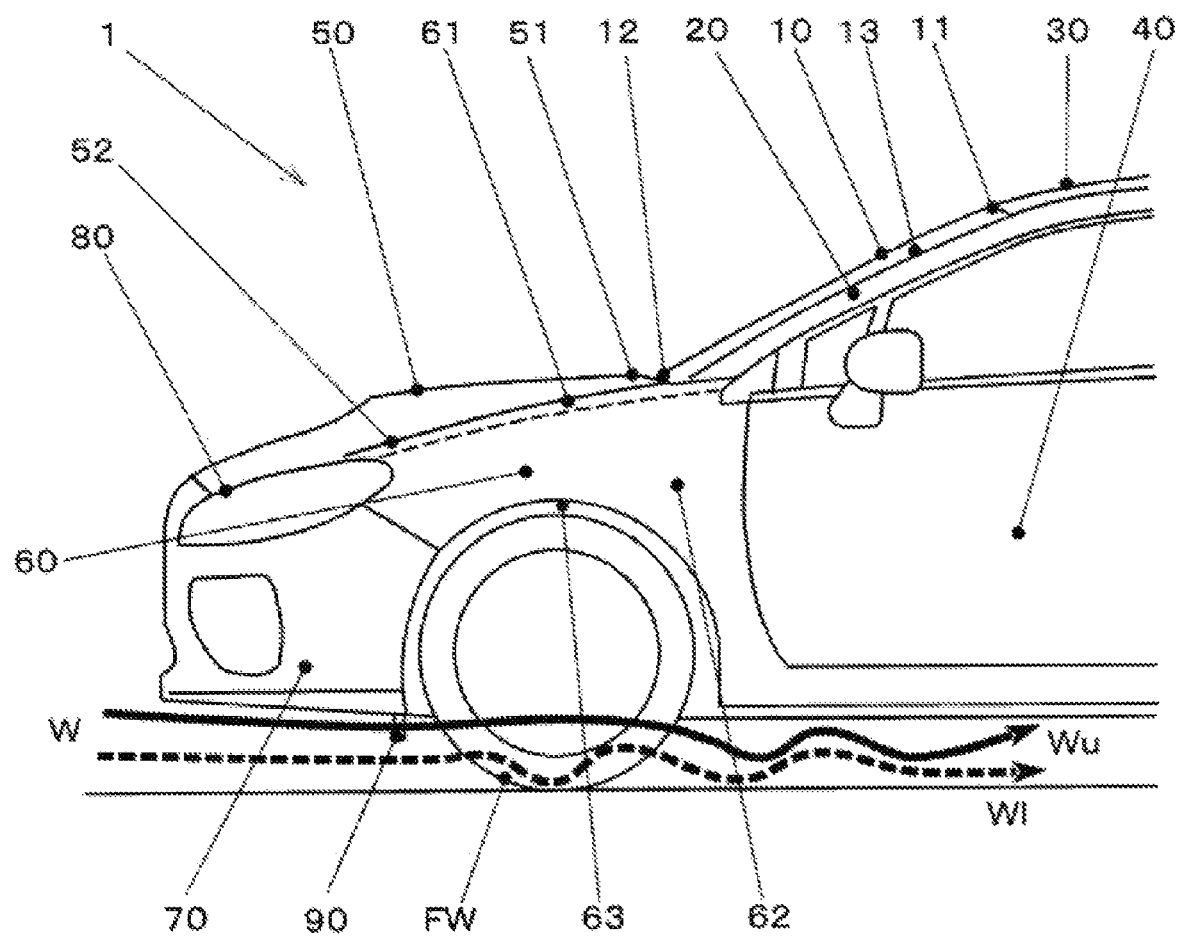
FIG. 5 schematically illustrates a vehicle according to a reference example of the disclosure, as viewed from sideways.

FIG. 5 schematically illustrates a vehicle according to a reference example of the disclosure, as viewed from sideways.

It is to be noted that the reference example and a second embodiment described later are described mainly regarding differences from the forgoing first embodiment. Constituent elements common to those of the forgoing first embodiment are denoted by the same reference characters, and description thereof is omitted.

The vehicle of the reference example is equivalent to the vehicle of the first embodiment except that the plasma actuator 100 is eliminated.

In the reference example, the upper-level air flow Wu is entrained in the lower-level air flow W1, to move backward of the vehicle at a lower flow rate with growing turbulence.

In contrast, in the first embodiment, as illustrated in FIG. 1, the plasma actuator 100 generates the airflow F moving obliquely backward and obliquely downward. The airflow F guides the upper-level air flows Wu downward while accelerating the upper-level air flows Wu, causing the upper-level air flows Wu to join the lower-level air flows W1, to discharge the air flows Wu and W1 backward of the vehicle at a high flow rate. Hence, it is possible to prevent aggravation of air resistance, aerodynamic noise, aerodynamic vibration, and operation stability caused by a difference in flow rates of the air flows Wu and W1 and influences of the turbulence of the air flow W1.

As described, in the first embodiment, it is possible to produce the following effects.

(1) At the upper level in the region between the floor panel FP and the road surface, the air flow Wu having collided with the flap 90 and separated itself vehicle-widthwise inward has relatively small turbulence and a high flow rate. Allowing the plasma actuator 100 to generate the airflow F makes it possible to guide the air flow Wu downward while accelerating the air flow Wu to a higher flow rate. This makes it possible to cause the air flow Wu to join the slow, very turbulent air flow W1 having collided with the front wheel FW at the lower level in the region between the floor panel FP and the road surface and separated itself. Thus, it is possible to raise the flow rates of the air flows Wu and W1, to discharge them backward of the vehicle.

Hence, it is possible to improve air resistance, aerodynamic noise, aerodynamic vibration, and operation stability.

(2) Changing an angle of the airflow F to be generated by the plasma actuator 100 in accordance with the vehicle speed makes it possible to produce airflow adjustment effects described above, as appropriate in a wide range of traveling conditions.

(3) The plasma actuator 100 may include the plurality of the plasma actuators 100, and the plurality of the plasma actuators 100 may be disposed in a distributed arrangement in the vehicle longitudinal direction. Some or all of the plurality of the plasma actuators 100 may be disposed on the rear side of the vehicle relative to the axle of the front wheel FW. This makes it possible for the air flow Wu moving while diffusing itself on the rear side of the front wheel FW to effectively join the lower-level air flow Wu. Hence, it is possible to obtain reliably the effects described above.

(4) The plasma actuator 100 may serve as an "airflow generator" in one embodiment of the disclosure. Thanks to the simple configuration of the plasma actuator 100 devoid of movable components, it is possible to generate the airflow F with high responsiveness.

Second Embodiment

Description now moves on to an airflow adjusting apparatus according to a second embodiment of the disclosure.

Figure 6:
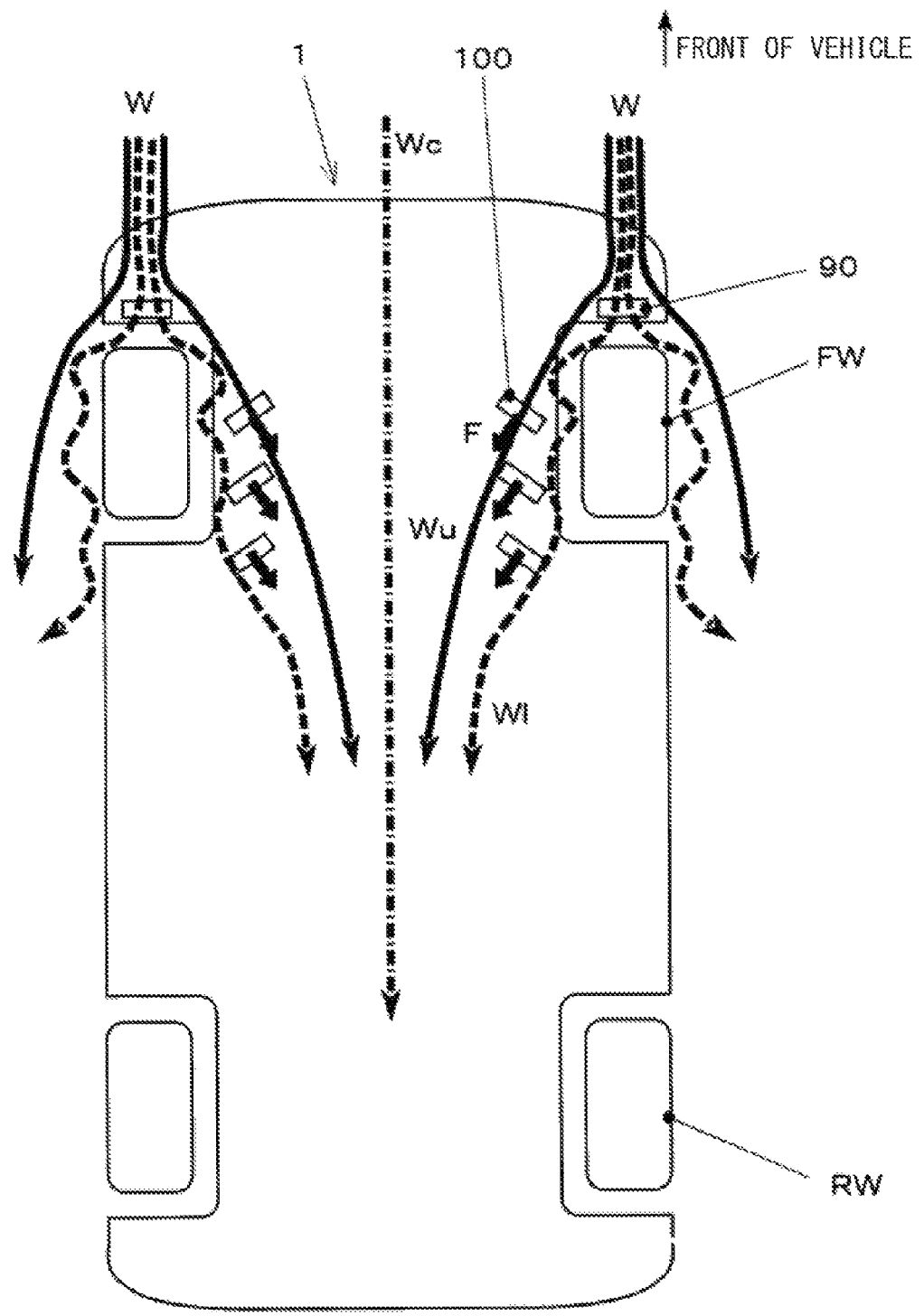
FIG. 6 schematically illustrates a vehicle including an airflow adjusting apparatus according to a second embodiment of the disclosure, as viewed from underneath.

FIG. 6 schematically illustrates a vehicle according to the second embodiment of the disclosure, as viewed from underneath.

In the second embodiment, each of the plasma actuators 100 may be disposed, in a bottom view of the vehicle 1, to generate the airflow F backward of the vehicle 1, and vehicle-widthwise inward. The airflow F moves obliquely relative to the vehicle longitudinal direction and the vehicle widthwise direction.

In the second embodiment, the airflow F to be generated by the plasma actuator 100 moves vehicle-widthwise inward. This makes it possible to cause, for example, the air flows Wu moving vehicle-widthwise sideward to join an air flow Wc moving centrally of the vehicle. The air flow Wc is under small influence of the collision with the front wheel FW and has an even higher flow rate. Hence, it is possible to accelerate and quickly discharge the air flow Wu backward of the vehicle body.

At this occasion, ejecting the airflow F downward makes it possible to allow both the upper-level air flow Wu and the lower-level air flow W1 to join the air flow Wc moving centrally of the vehicle.

Moreover, for example, in a range of a high vehicle speed, there may be cases where maximizing an output of the plasma actuator 100 still fails in guiding sufficiently the lower-level air flow W1 vehicle-widthwise inward. In such cases, allowing the direction of ejection of the airflow F may be allowed to come close to a direction along a horizontal plane, or the lower surface of the floor panel FP. This makes it possible to guide the upper-level air flow Wu toward centrally of the vehicle while suppressing the upper-level air flow Wu from joining the lower-level air flow W1.

MODIFICATION EXAMPLES

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

(1) The configurations of the vehicle and the airflow adjusting apparatus are not limited to the forgoing embodiments, but may be changed as appropriate.

For example, a vehicle type and a vehicle model of the vehicle are not limited to the forgoing embodiments, but may be changed as appropriate.

(2) The arrangement and the number of the plasma actuators in the forgoing embodiments, or the "airflow generators" in one embodiment of the disclosure, are merely exemplary, and may be changed as appropriate.

(3) In the forgoing embodiments, the airflow adjusting apparatus is provided on the front side of the vehicle on which the front wheels are provided, but the airflow adjusting apparatus may be provided on the rear side of the vehicle on which the rear wheels are provided.

(4) In the forgoing embodiments, the plasma actuator may serve as the "airflow generator" in one embodiment of the disclosure, but the airflow generation may be carried out by other methods than the use of the plasma actuator.

The configuration of the plasma actuator is not limited to those of the forgoing embodiments, but may be changed as appropriate.

In the forgoing embodiments, the three-pole plasma actuator is used to form the airflow in any direction. Instead, a combination of a plurality of bipolar plasma actuators may be used to form an airflow in any direction as a composite airflow of airflows generated by the plurality of the bipolar plasma actuators.

Furthermore, a single bipolar plasma actuator may be provided in a pre-tilted state in the underneath of the vehicle.

The voltage to be applied may be either an alternating voltage or a DC voltage. In a case with the DC voltage application, the DC voltage may be pulsed, or alternatively, polarity may be switchable to control a direction of the generation of the airflow.

In the forgoing embodiments, the DC voltage is applied to one electrode pair of the three-pole plasma actuator, while the alternating voltage is applied to the other electrode pair of the three-pole plasma actuator. However, such a configuration is merely exemplary and non-limiting.

For example, an alternating voltage may be applied to both electrode pairs, or alternatively, a DC voltage may be applied to both electrode pairs.

According to an aspect of the technology, an airflow adjusting apparatus includes a flap and an airflow generator. The flap is protruded, in front of a wheel, downward from a vehicle body of a vehicle. The airflow generator is provided in an underneath of the vehicle body and vehicle-widthwise inwardly from a wheel. The airflow generator is configured to generate an airflow backward and downward of the vehicle. The airflow moves obliquely relative to a horizontal plane.

At an upper level in a region between the underneath of the vehicle body and a road surface, an air flow having collided with the flap and separated itself vehicle-widthwise inward has relatively small turbulence and a high flow rate. Allowing the airflow generator to generate the airflow makes it possible to guide the air flow downward while accelerating the air flow to a higher flow rate. This makes it possible to cause the air flow to join a slow, very turbulent air flow having collided with the wheel at a lower level in the region between the underneath of the vehicle body and the road surface and separated itself. Thus, it is possible to raise the flow rates of the air flows, to discharge them backward of the vehicle.

Hence, it is possible to improve air resistance, aerodynamic noise, aerodynamic vibration, and operation stability.

Moreover, the airflow generator may be configured to change an angle to be formed by a direction of movement of a main flow component of the airflow with the horizontal plane. The processor is configured to allow the airflow generator to change the angle in accordance with a traveling state of the vehicle.

This makes it possible to change an angle of generation of the airflow in accordance with the traveling state of the vehicle, leading to optimization of airflow adjustment effects. Hence, it is possible to produce the airflow adjustment effects, as appropriate in a wide range of traveling conditions.

Furthermore, the airflow generator may include a plurality of airflow generators. Some or all of the plurality of the airflow generators may each be configured to generate an airflow having a speed component moving toward vehicle-widthwise centrally of the vehicle.

This makes it possible to cause an air flow having collided with the flap and separated itself vehicle-widthwise inward to join an air flow moving centrally of the vehicle. The air flow moving centrally of the vehicle is under small influence of the collision with the wheel and has an even higher flow rate. Hence, it is possible to accelerate and quickly discharge the air flow backward of the vehicle body.

In addition, the plurality of the airflow generators may be disposed in a distributed arrangement in a vehicle longitudinal direction. Some or all of the plurality of the airflow generators may be disposed on rear side of the vehicle relative to an axle of the wheel.

This makes it possible for an air flow moving while diffusing itself on the rear side of the wheel to effectively join a lower-level air flow. Hence, it is possible to obtain reliably the effects described above.

Moreover, the airflow generator may include a plasma actuator. The plasma actuator may include: at least one pair of electrodes; and a power supply configured to apply a voltage to the at least one pair of the electrodes.

Thanks to the simple configuration of the airflow generator devoid of movable components, it is possible to generate the flow with high responsiveness.

As described, according to the aspects of the technology, it is possible to provide an airflow adjusting apparatus that makes it possible to adjust appropriately airflows between an underneath of a vehicle body and a road surface.

The airflow adjustment processor 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjustment processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airflow adjustment processor 200 illustrated in FIG. 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An airflow adjusting apparatus to be provided in a vehicle, the vehicle including a wheel disposed to be partly protruded downward from a vehicle body of the vehicle, the airflow adjusting apparatus comprising:
   a flap protruded, in front of the wheel, downward from the vehicle body; and
   an airflow generator configured to generate an airflow, and provided in an underneath of the vehicle body and vehicle-widthwise inwardly from the wheel, the airflow moving backward and downward of the vehicle, and the airflow moving obliquely relative to a horizontal plane in a backward direction toward a rear side of the vehicle and a downward direction from the vehicle.

2. The airflow adjusting apparatus according to claim 1, further comprising a processor, wherein
   the airflow generator is configured to change an angle to be formed by a direction of movement of a main flow component of the airflow with the horizontal plane, the main flow component having a maximum speed in the airflow, and
   the processor is configured to cause the airflow generator to change the angle in accordance with a traveling state of the vehicle.

3. The airflow adjusting apparatus according to claim 2, wherein
   at least a part of the airflow generator is configured to generate an airflow having a speed component moving toward vehicle-widthwise centrally of the vehicle.

4. The airflow adjusting apparatus according to claim 3, wherein
   the airflow generator includes a plurality of airflow generators,
   the airflow generators are disposed in a distributed arrangement in a vehicle longitudinal direction, and
   one or more of the airflow generators are disposed on rear side of the vehicle relative to an axle of the wheel.

5. The airflow adjusting apparatus according to claim 4, wherein
   the airflow generator includes a plasma actuator including:
       at least one pair of electrodes; and
       a power supply configured to apply a voltage to the at least one pair of the electrodes.

6. The airflow adjusting apparatus according to claim 3, wherein
   the airflow generator includes a plasma actuator including:
       at least one pair of electrodes; and
       a power supply configured to apply a voltage to the at least one pair of the electrodes.

7. The airflow adjusting apparatus according to claim 2, wherein
   the airflow generator includes a plurality of airflow generators,
   the airflow generators are disposed in a distributed arrangement in a vehicle longitudinal direction, and
   one or more of the airflow generators are disposed on rear side of the vehicle relative to an axle of the wheel.

8. The airflow adjusting apparatus according to claim 7, wherein
   the airflow generator includes a plasma actuator including:
       at least one pair of electrodes; and
       a power supply configured to apply a voltage to the at least one pair of the electrodes.

9. The airflow adjusting apparatus according to claim 2, wherein
   the airflow generator includes a plasma actuator including:
       at least one pair of electrodes; and
       a power supply configured to apply a voltage to the at least one pair of the electrodes.

10. The airflow adjusting apparatus according to claim 1, wherein
    the airflow generator includes a plurality of airflow generators,
    the airflow generators are disposed in a distributed arrangement in a vehicle longitudinal direction, and
    one or more of the airflow generators are disposed on rear side of the vehicle relative to an axle of the wheel.

11. The airflow adjusting apparatus according to claim 10, wherein
    the airflow generator includes a plasma actuator including:
        at least one pair of electrodes; and
        a power supply configured to apply a voltage to the at least one pair of the electrodes.

12. The airflow adjusting apparatus according to claim 1, wherein
    the airflow generator includes a plasma actuator including:
        at least one pair of electrodes; and
        a power supply configured to apply a voltage to the at least one pair of the electrodes.

13. The airflow adjusting apparatus according to claim 1, wherein the airflow generator is configured to generate the airflow to move obliquely with respect to the horizontal plane of a floor panel of the vehicle, such that the generated air flow moves obliquely backward and downward of the vehicle toward the rear side of the vehicle.

14. The airflow adjusting apparatus according to claim 1, wherein the airflow generator changes an angle of the airflow generated by the airflow generator in accordance with a predetermined criterion of the vehicle including vehicle speed.

15. The airflow adjusting apparatus according to claim 1, wherein the airflow generator is configured to change an angle to be formed by a direction of movement of a main flow component of the airflow with the horizontal plane.

16. The airflow adjusting apparatus according to claim 1, further comprising a processor configured to control the airflow generator to change an angle in accordance with a traveling state of the vehicle.

17. The airflow adjusting system of a vehicle, the vehicle including a wheel disposed to be partly protruded downward from a vehicle body of the vehicle, the airflow adjusting apparatus comprising:
    a flap protruded, in front of the wheel, downward from the vehicle body;
    an airflow generator configured to generate an airflow, and provided in an underneath of the vehicle body and vehicle-widthwise inwardly from the wheel; and
    a processor configured to control the airflow generated by the airflow generator moving backward and downward of the vehicle, and the airflow moving obliquely backward and downward relative to a horizontal plane in a backward direction toward a rear side of the vehicle and a downward direction from the vehicle.

18. The airflow adjusting system according to claim 17, wherein the processor is configured to control the airflow generator to change an angle in accordance with a traveling state of the vehicle.

19. The airflow adjusting system according to claim 17, wherein
- the airflow generator includes a plurality of airflow generators,
- the airflow generators are disposed in a distributed arrangement in a vehicle longitudinal direction, and
- one or more of the airflow generators are disposed on rear side of the vehicle relative to an axle of the wheel.

20. The airflow adjusting system according to claim 17, further comprising:
- a sensor detecting vehicle state information of the vehicle,
- wherein the processor is configured to control the airflow generator to change an angle to be formed by a direction of movement of a main flow component of the airflow with the horizontal plane according to state information received from the sensor.

* * * * *